United States Patent [19]

Zerlik

[11] 4,384,222
[45] May 17, 1983

[54] FLEXIBLE, ELECTRICALLY INSULATING PIPE CONNECTION

[75] Inventor: Willibald Zerlik, Birr, Switzerland

[73] Assignee: BBC Brown, Boveri & Company, Limited, Baden, Switzerland

[21] Appl. No.: 235,640

[22] Filed: Feb. 18, 1981

[30] Foreign Application Priority Data

Feb. 3, 1980 [EP] European Pat. Off. ......... 80200187.5

[51] Int. Cl.$^3$ .............................................. H02K 1/32
[52] U.S. Cl. ....................................... 310/61; 62/505; 285/48; 285/302; 310/71
[58] Field of Search ...................... 62/505; 310/54, 61, 310/64, 71; 403/28, 30; 285/48, 49, 187, 302

[56] References Cited

U.S. PATENT DOCUMENTS

| 1,912,586 | 6/1933 | Lysholm | 310/61 |
| 3,420,553 | 1/1969 | Poxon et al. | 285/49 |
| 3,532,131 | 10/1970 | Lefere | 285/49 |
| 4,297,779 | 11/1981 | Melton et al. | 285/381 |

FOREIGN PATENT DOCUMENTS 577135 6/1976 Switzerland .

Primary Examiner—Ronald C. Capossela
Attorney, Agent, or Firm—Oblon, Fisher, Spivak, McClelland & Maier

[57] ABSTRACT

Flexible, electrically insulating pipe connections are required for electrical machines with liquid-cooled rotor winding between the water distribution chambers, which are rigidly connected to the body of the rotor, and the water distribution headers in the coil end. A pipe connection is proposed whose section on the side of the distribution chamber is designed as an insulating link which projects at least partially into the wall of the water distribution chamber. The section on the side of the coil end is designed as a flexible link which can be shifted in axial direction relative to the insulating link or which is axially movable in itself.

18 Claims, 6 Drawing Figures

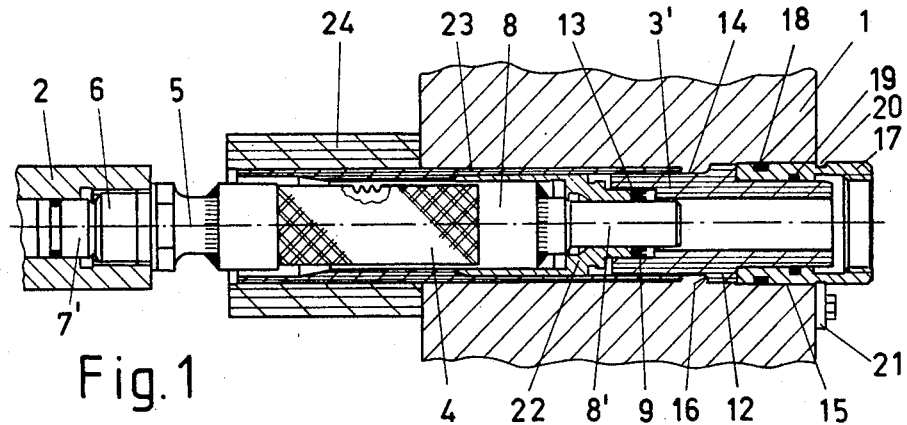
Fig. 1
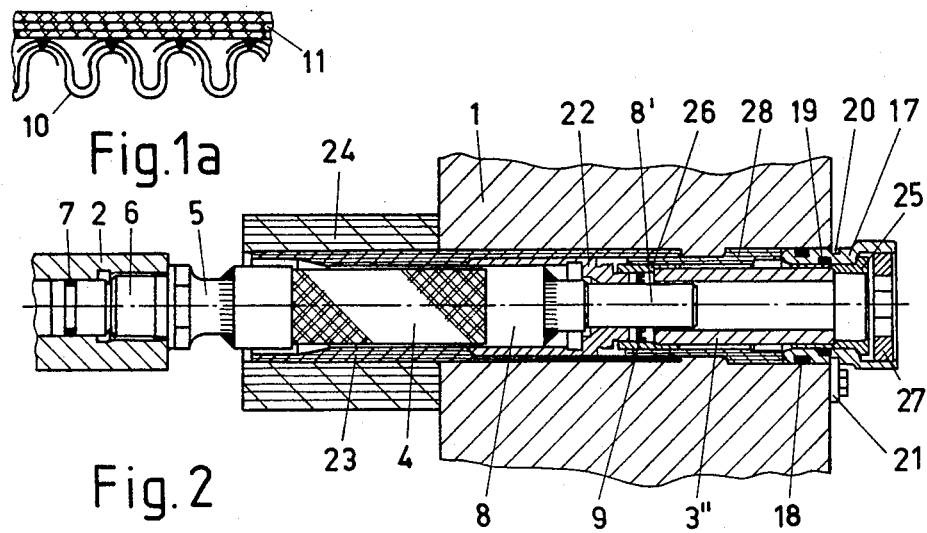
Fig. 1a
Fig. 2
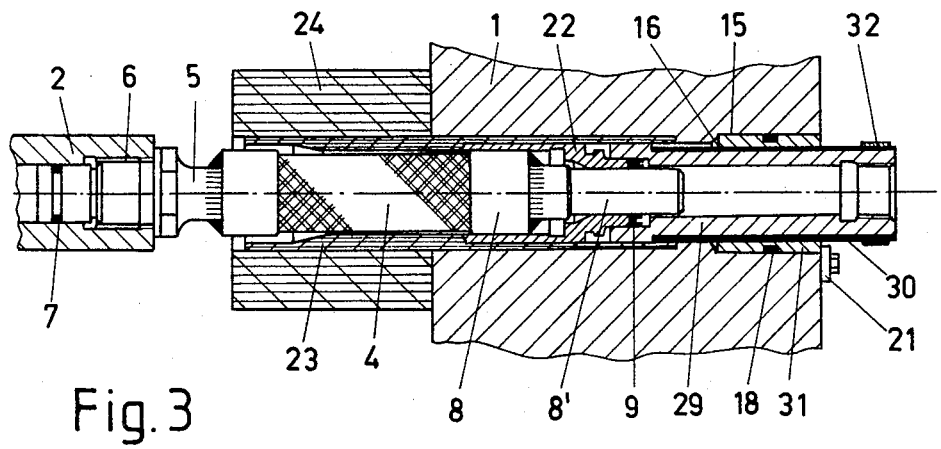
Fig. 3

4,384,222

FLEXIBLE, ELECTRICALLY INSULATING PIPE CONNECTION

BACKGROUND OF THE INVENTION

1. Field of the Invention

The present invention relates to a flexible, electrically insulating pipe connection between the water distribution chamber and the end of the coil top on the side of the distribution chamber on a water-cooled rotor of an electrical machine. A pipe connection of this kind is known, for example, from Swiss Pat. No. 577,135.

2. Description of the Prior Art

Pipe connections between water distribution chambers and the winding leads in the coil end of a water-cooled rotor of an electrical machine determine the operating safety of the electrical machine. In order to meet the requirements demanded of them, the pipe connections must have the characteristics of electrical potential separation between the water distribution chamber (at ground potential) and the winding potential, and compensation for thermally and mechanically caused relative movements between the coil end and the water distribution chamber, which is rigidly connected with the body of the rotor.

The known pipe connections which have these characteristics can essentially be divided into two categories. In the first category, for example according to the Swiss Pat. No. 577,135, the pipe connection consists of a hose section formed of plastic with two connecting pieces of metal which project with a nipple into the hose at the ends of the hose and which are connected with the base section by means of a sleeve-shaped fastening component resting against the outer circumference of the hose. The hose section is provided with a compression-resistant shielding which extends to below the two fastening components. At least one end of the hose section projects beyond the sleeve-shaped fastening component. Thus, the required characteristics of thermal separation and relative movement compensation are incorporated in a single structural component, the plastic hose.

In the second category of pipe connections, as it is described and shown in Swiss Pat. No. 595,715 for example, metal pipes are connected to the water distribution chamber with insulating connecting links in between for the electrical potential separation. The metal pipes run mostly in grooves in the rotor shaft at the coil end on the side of the rotor ball. Flange-shaped and ring-shaped supports are provided in the space outside the coil end while the radial fastening of the metal pipes is effected below the coil end by means of grooved wedges. Relative movements between the coil end and the insulating connecting links, which are rigidly connected with the rotor shaft, are absorbed by the flexibility of the metal pipes.

SUMMARY OF THE INVENTION

It is the object of the invention to create a flexible, electrically insulating pipe connection which possesses high operational safety, and a simple and economical structure.

Beginning with a pipe connection of the type mentioned in the introduction, the accomplishment of this task by means of the invention, is characterized by the fact that the end of the pipe connection on the side of the water distribution chamber is designed as an insulating link and projects, at least partially, into the wall of the water distribution chamber while the end of the pipe connection on the side of the coil end is designed as a flexible link which is arranged in a shiftable manner in the axial direction with respect to the insulating link, or can itself be axially expanded or contracted.

The pipe connection according to the invention requires little space in the axial and radial directions. By dividing the pipe connection into two sections with different tasks, both sections can be optimally formed for the requirements which they must meet. The insulating link is protected by the wall of the water distribution chamber against effects from outside forces (centrifugal forces) as well as against hydrostatic pressure. This is particularly true when the insulating link is placed entirely into the wall of the water distribution chamber. The insulating pipe there produces the necessary electrical potential separation between water distribution chamber and the flexible link, which is at the winding potential, and serves at the same time to guide and support the pipe connection. Additional support for the connecting point between insulating link and flexible link is provided by a further embodiment in which the spacing sleeve consists of metal or an insulating material and can be easily adjusted to the outer or inner contours of the components of the connecting point.

In principle, two types of flexible links can be used. Links may be used which essentially permit only movements diagonally to the longitudinal axis of the flexible link but cannot absorb any movements in longitudinal direction; for example, comparatively thin-walled corrugated pipes which are reinforced by one or several layers of reinforcement. Also links which, besides movements diagonally to the longitudinal axis, can also be moved in the longitudinal direction; for example, so-called compensator pipes.

With the use of flexible links of the first mentioned type, it is expedient to provide the end of the flexible link on the side of the distribution chamber with a pipe-shaped extension which projects into the borehole of the insulating link, preferably without touching it, and to additionally provide a stuffing box packing, preferably a lip packing, between the extension and the insulating link. Stuffing box packings are not required with the use of compensator pipes since relative movements, which occur between the insulating link (rigidly arranged in the water chamber wall) and the winding are absorbed by the compensator pipe, itself flexible in the longitudinal direction. In this case, the end of the flexible link on the side of the distribution chamber can be rigidly connected with the insulating link by placing a packing in between.

In accordance with another embodiment of the invention, the insulating link consists of a pipe of oxide ceramics which is provided with a collar on its outer circumference. This collar rests at the front of a recess extending in the axial direction in the wall on the water side of the water distribution chamber. A sleeve with inner and outer seals slides into the annulus between the pipe and the recess and is secured against axial shifting.

In another embodiment, a pipe of oxide ceramics is used, which is provided with metal sleeves on both ends which are partially designed as sealing surfaces. The stuffing box packing is arranged between the inner wall of a portion of one of the metal sleeves and the pipe-shaped extension of the flexible link. The sealing or axial fixing of the insulating sleeve on the side of the distribution chamber is preferably done by extending the end of the metal sleeve in a flange-like manner on the water side thereof, by inserting a sleeve with inner and outer seals into the annulus between metal sleeve and the wall of the distribution chamber on the water side and by installing a safety ring at the end of the sleeve on the water side at a distance from one of the metal sleeves.

All of the embodiments of the insulating sleeve are characterized by high temperature resistance and mechanical carrying capacity. They permit a far more generous creepage path in comparison with known pipe connections, for example, those according to the Swiss Pat. No. 577,135, mentioned in the introduction. Furthermore, they permit a leakage test with helium, which is absolutely necessary in case of water-cooled rotors and which is only conditionally possible with the use of plastics, particularly polytetrafluoride ethylene or perfluoride alcoxy.

The design of the insulating link has the same advantageous characteristics, where the insulating link is a metal pipe surrounded on the outside by an insulating material, preferably polyvinylidene fluoride, on which a shrink-fit sleeve is placed. This plastic-metal compound part is inserted into the wall of the water distribution chamber by placing a seal between itself and the chamber, and is secured there against axial shifting. The shrink-fit sleeve preferably consists of a corrosion-resistant mold-memory alloy having a Ni-Cu-Ti base. The insulating material between metal pipe and shrink-fit sleeve is actually not absolutely helium-tight and is inclined to become liquid under high temperatures and mechanical loads, but the diffusion paths can be designed of a sufficient size, and the specific surface load of the shrink-fit surface reduces the danger of liquification to a considerable extent.

In principle, both types of flexible links can be combined with the three insulating sleeves whereby the direct (rigid) connection between an oxide ceramic pipe and a pipe compensator could prove critical under certain circumstances.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 shows the first embodiment of a pipe connection according to the invention with a reinforced metal hose as a flexible link and a pipe of oxide ceramics as the insulating link;

FIG. 1a is a sectional view which shows clearly the structure of the reinforced metal hose;

FIG. 2 shows the second embodiment of a pipe connection according to the present invention, which is similar to the one shown in FIG. 1, but where the insulating link is provided with metal sleeves on both ends;

FIG. 3 shows the third embodiment of a pipe connection according to the present invention where, in contrast to the designs shown in FIGS. 1 and 2, the insulating link is a plastic-metal compound part;

DETAILED DESCRIPTION OF THE PREFERRED EMBODIMENTS

Figure 4:
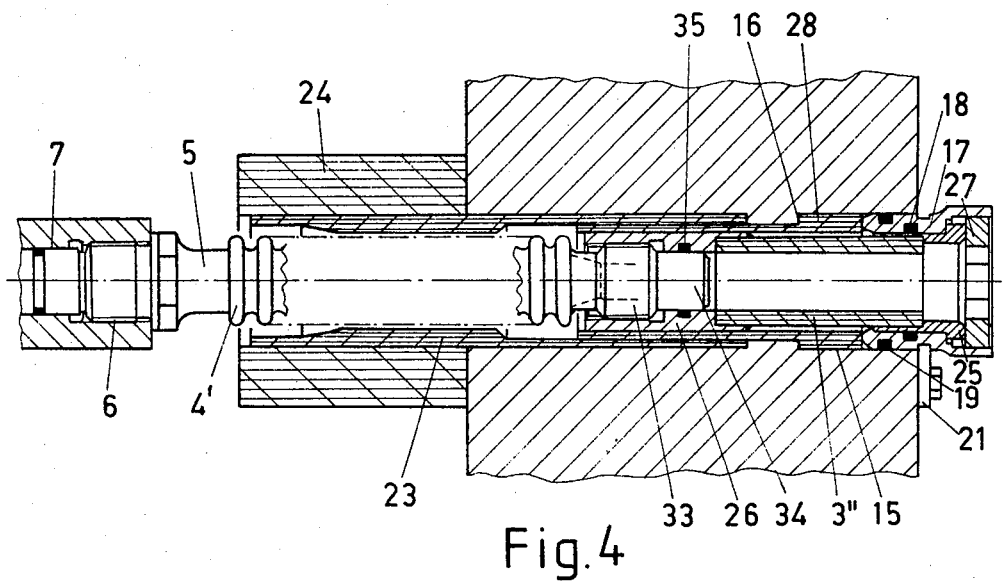
FIG. 4 shows the fourth embodiment of a pipe connection according to the present invention with a compensator pipe as the flexible link where, as in FIG. 2, the insulating link is provided with metal sleeves on both ends.

For reasons of clarity, only a portion of the water distribution chamber 1, and the water distribution or coil header 2 handling the supply and discharge of the rotor winding coolant of the rotor of the electrical machine, are shown in FIG. 1. The hydraulic connection between the two parts is effected by a pipe connection with an insulating link 3' and a flexible link 4. The end of the flexible link 4 on the side of the water distribution or coil header is screwed into the water distribution header 2 in a liquid and gas-tight manner by means of a connecting fitting 5 consisting of a threaded part 6 and a sealing part 7'. The end of the flexible link on the side of the distribution chamber is also provided with a connecting fitting 8 which ends in a pipe-shaped extension 8' projecting into the borehole of the insulating link 3' without touching it. A lip packing 9 provides the sealing between the insulation link and the flexible link and at the same time permits relative movements in the axis direction between the two links. As can be noticed from FIG. 1a, the portion of the flexible link 4 between the two connecting fittings consists of a double-wall corrugated pipe 10 of stainless steel which is surrounded by a multi-layered braiding 11 of steel wire. This structure permits movements in a direction diagonally to the longitudinal axis of the flexible link when under a high pressure load. The flexible link cannot absorb any movement in the longitudinal direction since it is already extended owing to the liquid pressure acting in its interior.

The insulating link 3' is a pipe of technical ceramics having an aluminum oxide base. It has a collar 12 in its center section. The end of the ceramic pipe on the coil end is expanded in its interior diameter. The inner surface 13 of the expansion is machined to serve as a sealing surface for the packing 9. The ceramic pipe is placed along practically its entire length into the borehole 14 in the wall of the water distribution chamber 1. This borehole 14 is provided with a recess 15 on the distribution chamber side, against the front surface 16 of which the collar 12 of the ceramic pipe 3' axially rests. A sleeve 17 is inserted into the annulus between the ceramic pipe 3' and the recess 15 and includes an outer seal 18 and an inner seal 19. A circumferential annular tee-slot 20 has the purpose, in connection with a threaded safety plate 21, of axially fixing the sleeve 17, and thus the ceramic pipe 3'.

A spacer sleeve 22 of metal is provided to support the fitting 8 and to reinforce the connecting point between the flexible and the insulating links. The spacer sleeve embraces the entire portion of the fitting 8 on the water distribution chamber side thereof, and the extension 8' thereof, and projects partially into the expansion of the ceramic pipe 3'. In this manner, no undesirable forces are exerted on the ceramic pipe 3'. An insulating sleeve 23 fitted to the wall of the borehole 14 in the water chamber provides the potential separation between the flexible link 4 and the water chamber 1. This insulating sleeve surrounds the end of the ceramic pipe on the coil end thereof and extends over the entire length of the flexible link 4. The inner diameter of the insulating sleeve 23 in the area of the braiding 11 and of the fitting 5 is such that an annulus exists between the flexible link and the insulating sleeve, which assures the movement of the flexible link diagonally to its longitudinal axis. Additionally, the insulating sleeve 23 serves the purpose of supporting the flexible link 4 against centrifugal forces.

The portion of the flexible link 4, and the section of the insulating sleeve 23 surrounding said portion, which project from the wall of the water distribution chamber 1, are positioned within the borehole of an insulating ring 24 which surrounds the rotor shaft (not shown) and is rigidly connected with the water distribution chamber 1.

With the exception of the design of the insulating 3", the pipe connection shown in FIG. 2 is the same as the one described above. The same parts are provided with the same reference numbers in both drawings. The insulating link 3" consists of a smooth pipe of technical ceramics having an aluminum oxide base, which is provided with metal sleeves 25 and 26 over both ends. The corrosion-resistant metal sleeves 25 and 26 are connected with the ceramic pipe, for example, by soldering. Each of the metal sleeves embrace an end of the ceramic pipe and extend beyond them at the sides. The inner surface of the metal sleeve 26 on the coil end of the ceramic pipe is designed as a sealing surface for the lip packing 9. The sleeve 17 has essentially the same design as the one in FIG. 1. Additionally, its end on the side of the distribution chamber is provided with an inner thread onto which a safety ring 27, placed at a distance from the end of the metal sleeve 25 on the side of the distribution chamber, is screwed.

In order to have the possibility of placing additional insulating links according to FIGS. 1 and 2 into the boreholes 14 of the water distribution chamber, a stepped insulating pipe 28 is additionally inserted into the borehole 14 from the direction of the water distribution chamber in the design according to FIG. 2, whose end, which is reduced in diameter, reaches to the end of the metal sleeve 26 on the side of the coil. The stepped pipe 28 there enlarges the creepage path between the metal sleeve 26 and the wall of the borehole 14.

In the embodiment of an electrically insulated pipe connection shown in FIG. 3, the insulating link consists of a metal pipe 29 which is provided with a jacket 30 of, for example, polyvinylidene fluoride. A shrink-fit sleeve 31 with an annular tee-slot is placed on the outer circumference of the metal pipe 29 at the axially central portion thereof. This insulating link is inserted into the borehole 14, which is provided with a recess 15 therefor, from the distribution chamber side of the borehole. The sleeve 31 provides sealing from the direction of the water distribution chamber by placing in the tee-slot an outer seal 18 between the sleeve 31 and the recess 15. The end coil of the shrink-fit sleeve 31 rests at the front surface 16 of the recess. The axial path of the recess is about the same as the length of the shrink-fit sleeve 31. A security plate 21 is screwed into the distribution chamber to assure the axial securing of the insulating link. A shrink-fit ring 32 is arranged on the end of the metal pipe 29 on the side of the distribution chamber, which prevents water from penetrating between the metal pipe 29 and the jacket 30.

Both shrink-fit sleeves 31 and 32 consist of mold memory alloy having a titanium/nickel/copper base. As to the process for the manufacture of the insulating link according to FIG. 3, reference is made to the German Disclosure Publication 28 37 541 in which all details concerning the selection of the alloy and the manufacture of the shrink-fit connection can be found.

All of the embodiments described above have in common a link which is flexible in a direction diagonal to the longitudinal axis but not flexible in the direction of its longitudinal axis. Axial relative movements between the water distribution chamber and the coil end thus require stuffing box packings at the connecting point between flexible and insulating links. The embodiments of the invention described below permit one to omit such a dynamically loaded packing owing to the fact that the flexible link is itself elastic in the longitudinal direction.

In the pipe connections shown in FIG. 4, the flexible link is a compensator pipe 4' which is provided with connecting fittings on both sides thereof. The connecting fitting 5 on the side of the coil end corresponds to those of FIGS. 1 to 3, but the connecting fitting on the side of the distribution chamber has a threaded part 33 and a sealing part 34, which are screwed into the metal sleeve 26, including an inner threading, on the side of the coil end of the insulating link. Sealing is provided by the annular gasket 35. Apart from the different design of the metal sleeve 26, the insulating link has the same structure as has been described above in connection with FIG. 2.

Figure 5:
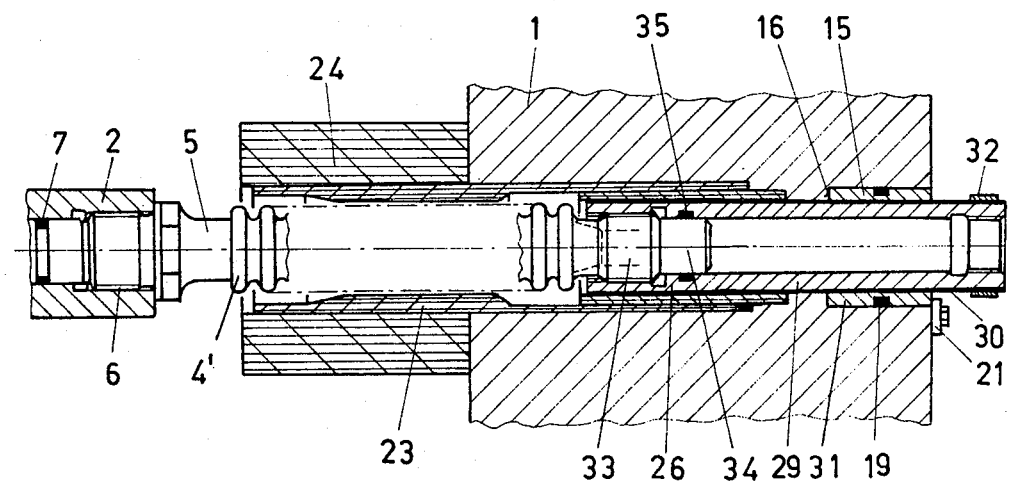
FIG. 5 shows the fifth embodiment of a pipe connection according to the present invention with a compensator pipe, and plastic-metal compound part as the insulating link.

A compensator pipe arrangement also is used as the flexible link in the design according to FIG. 5, the structure of which is the same as that according to FIG. 4. The end of the compensator pipe on the side of the distribution chamber, which is provided with a threaded part 33 and a sealing part 34, is screwed into the coil end side of a metal pipe 29 provided with an inner thread and a sealing surface. The remaining design and arrangement of the pipe connection corresponds with those according to FIG. 3.

All the embodiments of the invention have in common the ability to permit one to mount or dismount the pipe connection consisting of the insulating link and the flexible link from the direction of the water distribution chamber. Thus, the largest outer diameter of the flexible link has been chosen smaller than the inner diameter of the borehole in the wall of the water distribution chamber; the same applies to the spacer sleeve 22. The accessibility of the water distribution chamber interior is guaranteed by the fact that it is surrounded by a hub ring in the usual manner, and is closed off in this fashion. Therefore, it is no longer necessary to carry out the time-consuming withdrawing of the rotor hub and water distribution chamber during mounting or dismounting work on the pipe connections.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In an electrical machine having a water cooled rotor including a coil end and a water distribution chamber having a wall including a bore, a flexible electrically insulating pipe connection between said wall and said coil end, said connection comprising:

an insulating link projecting at least partially into said bore of said wall of said water distribution chamber at the distribution chamber end thereof; and a flexible link communicating with the coil end of said insulating link and also communicating with said coil.

2. The pipe connection of claim 1 wherein said flexible link communicates with said insulating link in an axially movable manner.

3. The pipe connection of claim 2 including a spacer sleeve in the area of communication between said insulating link and said flexible link.

4. The pipe connection of claim 2 wherein said insulating link has a bore therethrough and including an extension pipe portion on the end of said flexible link which communicates with said insulating link, said extension pipe portion extending into said bore of said insulating link, and further including lip packing means between the periphery of said extension pipe portion and said bore of said insulating link.

5. The pipe connection of claim 4, wherein said insulating link comprises a ceramic oxide pipe.

6. The pipe connection of claim 5 including corrosion resistant metal sleeves fixed to each end of said insulating link and having portions forming sealing surfaces.

7. The pipe connection of claim 6 wherein the sealing surface of a first one of said corrosion resistant metal sleeves at the coil end of said insulating link forms a first sealing surface and extends axially beyond said insulating link to form an extension of the bore thereof, wherein said lip packing extends radially between said first sealing surface and said extension pipe portion.

8. The pipe connection of claims 6 or 7 including a flange on the water distribution chamber end of a second one of said corrosion resistant metal sleeves;

a sleeve positioned in an axially fixed manner within the annulus defined by the water distribution chamber end of said bore in said wall and said insulating link, said sleeve within said annulus including inner and outer sealing means; and a safety ring secured in said sleeve in said annulus and spaced from the water distribution chamber end of said flange.

9. The pipe connection of claim 5 including:

a circumferential collar on the outer periphery of said insulating link;

an enlarged portion in said bore of said wall at the end of said wall opposite said coil, said collar being positioned in the coil end of said enlarged portion of said bore; and a sleeve positioned in an axially fixed manner within the annulus defined by the remainder of said enlarged portion and said insulating link, said sleeve including inner and outer sealing means.

10. The pipe connection of claim 4 wherein said insulating link comprises a metal pipe covered with insulating material, and including a sleeve shrink-fit on said insulating link and positioned in the annulus defined by said bore in said wall and by said insulating link, further including means for axially securing said shrink-fit sleeve.

11. The pipe connection of claim 10 wherein said shrink-fit sleeve is formed of a corrosion resistant memory form alloy.

12. The pipe connection of claim 2 wherein said flexible link comprises at least one layer of a reinforced corrugated pipe, and fittings fixed to each end of said pipe.

13. The pipe connection of claim 1 wherein said flexible link is connected so as to axially expand and contract.

14. The pipe connection of claims 2 or 13 including an insulating pipe in a portion of said bore and extending out of said bore on the coil side of said wall, wherein said flexible link is located within said insulating pipe and extends partially into said bore.

15. The pipe connection of claim 13 wherein said flexible link comprises a compensator pipe, wherein said end of said flexible link communicating with said insulating link is fastened to said insulating link and includes sealing means therebetween.

16. The pipe connection of claim 15 wherein said insulating link is formed of a ceramic oxide, and including metal sleeves on each end thereof.

17. The pipe connection of claim 15 wherein said insulating link comprises a metal pipe covered with insulating material, and including a sleeve-shrink-fit on said insulating link and positioned in the annulus defined by said bore in said wall and by said insulating link, further including means for axially securing said shrink-fit sleeve.

18. The pipe connection of claim 17 wherein said shrink-fit sleeve is formed of a corrosion resistant memory form alloy.

* * * * *